US007801941B2

(12) United States Patent
Conneely et al.

(10) Patent No.: US 7,801,941 B2
(45) Date of Patent: Sep. 21, 2010

(54) APPARATUS AND METHOD FOR EXCHANGING DATA BETWEEN TWO DEVICES

(75) Inventors: Shane Conneely, Hoboken, NJ (US);
Nathanial Freitas, New York, NY (US);
Will Meyer, Brooklyn, NY (US);
Jonathan Oakes, New York, NY (US);
Evan Simeone, New York, NY (US)

(73) Assignee: Palm, Inc., Sunnyvale, CA (US)

( * ) Notice: Subject to any disclaimer, the term of this patent is extended or adjusted under 35 U.S.C. 154(b) by 738 days.

(21) Appl. No.: 10/159,570

(22) Filed: May 31, 2002

(65) Prior Publication Data

US 2003/0158892 A1  Aug. 21, 2003

Related U.S. Application Data

(60) Provisional application No. 60/303,412, filed on Jul. 9, 2001, provisional application No. 60/303,391, filed on Jul. 9, 2001.

(51) Int. Cl.
*G06F 15/16* (2006.01)
(52) U.S. Cl. .................. 709/200; 707/200; 707/201; 455/3.03; 455/414.4
(58) Field of Classification Search .................. 705/26; 707/10, 200, 3, 104, 201; 709/203, 215, 709/217, 230, 206, 224, 227, 201, 218, 213, 709/228; 713/156; 445/405, 414.4; 370/331; 345/744
See application file for complete search history.

(56) References Cited

U.S. PATENT DOCUMENTS

| | | | |
|---|---|---|---|
| 5,530,693 A * | 6/1996 | Averbuch et al. ............ 370/331 |
| 5,758,088 A | 5/1998 | Bezaire et al. | |
| 5,784,562 A * | 7/1998 | Diener ........................ 709/217 |
| 5,872,926 A | 2/1999 | Levac et al. | |
| 5,907,678 A * | 5/1999 | Housel et al. ................ 709/213 |
| 5,974,461 A * | 10/1999 | Goldman et al. ............ 709/224 |
| 5,999,942 A * | 12/1999 | Talati ........................ 707/104.1 |
| 6,055,424 A * | 4/2000 | Tornqvist et al. ......... 455/414.4 |
| 6,107,944 A | 8/2000 | Behr et al. | |
| 6,134,582 A * | 10/2000 | Kennedy .................... 709/206 |
| 6,151,628 A | 11/2000 | Xu et al. | |
| 6,167,426 A | 12/2000 | Payne et al. | |
| 6,167,441 A | 12/2000 | Himmel | |
| 6,285,683 B1 | 9/2001 | Lin | |
| 6,336,135 B1 * | 1/2002 | Niblett et al. ............... 709/215 |
| 6,393,569 B1 | 5/2002 | Orenshteyn | |
| 6,442,687 B1 * | 8/2002 | Savage ........................ 713/156 |

(Continued)

FOREIGN PATENT DOCUMENTS

EP  1914640  4/2006

OTHER PUBLICATIONS

International Search Report for International Application No. PCT/US01/00946; mailed Apr. 10, 2001 (1 pg.).

(Continued)

*Primary Examiner*—Dustin Nguyen
(74) *Attorney, Agent, or Firm*—Mahamedi Paradice Kreisman LLP

(57) ABSTRACT

A handheld computer is provided that includes a transport component that receives a request to perform an action from a handheld computer. A router is coupled to the transport component and identifies an action contained in the received request. An executor is coupled to the router and executes the identified action. Additionally, the executor generates a response based on execution of the identified action. The transport component also communicates the response to the handheld computer.

30 Claims, 5 Drawing Sheets

U.S. PATENT DOCUMENTS

| | | | |
|---|---|---|---|
| 6,477,543 B1* | 11/2002 | Huang et al. | 707/200 |
| 6,484,150 B1* | 11/2002 | Blinn et al. | 705/26 |
| 6,546,425 B1* | 4/2003 | Hanson et al. | 709/227 |
| 6,563,800 B1 | 5/2003 | Salo et al. | |
| 6,606,486 B1 | 8/2003 | Cubbage et al. | |
| 6,618,763 B1 | 9/2003 | Steinberg | |
| 6,636,733 B1 | 10/2003 | Helferich | |
| 6,647,409 B1 | 11/2003 | Sherman et al. | |
| 6,671,355 B1 | 12/2003 | Spielman et al. | |
| 6,795,710 B1 | 9/2004 | Creemer | |
| 6,810,405 B1* | 10/2004 | LaRue et al. | 707/201 |
| 6,819,945 B1 | 11/2004 | Chow et al. | |
| 6,847,632 B1 | 1/2005 | Lee et al. | |
| 6,888,927 B1 | 5/2005 | Cruickshank et al. | |
| 6,917,806 B2 | 7/2005 | Chng et al. | |
| 6,941,326 B2 | 9/2005 | Kadyk et al. | |
| 6,961,567 B1 | 11/2005 | Kuhn | |
| 7,003,327 B1 | 2/2006 | Payne et al. | |
| 7,020,685 B1 | 3/2006 | Chen et al. | |
| 7,051,080 B1* | 5/2006 | Paul et al. | 709/217 |
| 7,069,293 B2* | 6/2006 | Cox et al. | 709/203 |
| 7,092,998 B2 | 8/2006 | Frietas et al. | |
| 7,103,370 B1 | 9/2006 | Creemer | |
| 7,218,921 B2 | 5/2007 | Mendiola et al. | |
| 7,266,379 B2 | 9/2007 | Blight et al. | |
| 7,362,311 B2 | 4/2008 | Filner et al. | |
| 7,627,680 B2* | 12/2009 | Hutcheson et al. | 709/228 |
| 2001/0016845 A1* | 8/2001 | Tribbensee | 707/10 |
| 2001/0020892 A1 | 9/2001 | Helferich | |
| 2001/0047272 A1 | 11/2001 | Frietas et al. | |
| 2002/0002596 A1 | 1/2002 | Sugiarto et al. | |
| 2002/0065064 A1* | 5/2002 | Griffith et al. | 455/405 |
| 2002/0065879 A1* | 5/2002 | Ambrose et al. | 709/203 |
| 2002/0083322 A1 | 6/2002 | Lagosanto et al. | |
| 2002/0103881 A1* | 8/2002 | Granade et al. | 709/218 |
| 2002/0109718 A1* | 8/2002 | Mansour et al. | 345/744 |
| 2002/0116500 A1* | 8/2002 | Arora et al. | 709/227 |
| 2002/0143971 A1* | 10/2002 | Govindarajan et al. | 709/230 |
| 2002/0174106 A1* | 11/2002 | Martin | 707/3 |
| 2003/0050046 A1 | 3/2003 | Conneely et al. | |
| 2003/0078960 A1* | 4/2003 | Murren et al. | 709/203 |
| 2004/0199574 A1* | 10/2004 | Franco et al. | 709/201 |
| 2005/0113092 A1 | 5/2005 | Coppinger et al. | |
| 2005/0148356 A1 | 7/2005 | Ferguson et al. | |
| 2005/0176451 A1 | 8/2005 | Helferich | |
| 2006/0030306 A1 | 2/2006 | Kuhn | |
| 2007/0178899 A1 | 8/2007 | Kuhn | |

OTHER PUBLICATIONS

Press Release dated Feb. 18, 2002 entitled "Ecrio and Lucent Sign Global Partnership Aimed at Bringing Rich Instant Messaging Solutions to Mobile Operators"; Ecrio Inc. Copyright 2004; http://www.ecrio.com/pressre10.html; (2 pgs.).

U.S. Appl. No. 11/449,001, Creemer.

U.S. Appl. No. 11/901,272, Kansal et al.

U.S. Appl. No. 60/954,022, Swift et al.

Final Office Action mailed Jul. 27, 2009 in U.S. Appl. No. 11/426,534.

Final Office Action mailed Jul. 3, 2008 in U.S. Appl. No. 11/426,534.

Final Office Action mailed Nov. 19, 2009 in U.S. Appl. No. 11/426,534.

Final Office Action mailed Aug. 27, 2006 in U.S. Appl. No. 09/794,082.

Non-Final Office Action mailed Feb. 24, 2009 in U.S. Appl. No. 11/426,534.

Non-Final Office Action mailed Jul. 15, 2005 in U.S. Appl. No. 09/794,082.

Non-Final Office Action mailed May 16, 2008 in U.S. Appl. No. 09/794,082.

Restriction Requirement mailed Dec. 5, 2008 in U.S. Appl. No. 11/426,534.

* cited by examiner

APPARATUS AND METHOD FOR EXCHANGING DATA BETWEEN TWO DEVICES

CROSS-REFERENCE TO RELATED APPLICATIONS

The present application claims priority to Provisional Patent Application Ser. No. 60/303,412, filed Jul. 9, 2001, the disclosure of which is hereby incorporated by reference in its entirety. The present application also claims priority to Provisional Patent Application Ser. No. 60/303,391, filed Jul. 9, 2001, the disclosures of which is also incorporated by reference herein in its entirety.

TECHNICAL FIELD

The apparatus and method discussed herein relates to handheld computers and, more particularly, to exchanging data between a handheld computer and another device.

BACKGROUND

Handheld computers, often referred to as personal digital assistants (PDAs), are intended to be mobile devices. In general, small sizes are desired for handheld computers to enhance mobility. Additionally, it is often desirable to maintain relatively low selling prices for handheld computers so they will appeal to a wider range of customers. This smaller size and low price tend to limit the processing power and storage capacity of handheld computers. Thus, handheld computers are typically less powerful than their desktop or server counterparts.

Many handheld computers are capable of establishing a wireless communication link between the handheld computer and another computing device, such as another handheld computer, a desktop computer, or a server. In certain situations, handheld computers may rely on other computing devices to perform functions on behalf of the handheld computer. For example, a handheld computer may rely on a server to receive and store email messages that can be accessed and read by a handheld computer. The handheld computer periodically establishes a connection with the server and views email messages stored on the server. After viewing the email messages, the connection between the server and the handheld computer is terminated. Since the connection between the server and the handheld computer is not continuous, it is desirable to provide mechanisms that support an efficient exchange of data between the server and the handheld computer.

SUMMARY OF THE INVENTION

Embodiments of the apparatus and method discussed herein provide for a handheld computer capable of exchanging data with other computing devices, such as servers, desktop computers, laptop computers, or other handheld computers. The handheld computer is aware of various actions that the server or other computing device is capable of performing on behalf of the handheld computer. The handheld computer then requests certain actions from the appropriate server based on the handheld computer's knowledge of that server's capabilities. The handheld computer may also group multiple actions in a single request sent to the server during a single communication session, rather than sending multiple separate requests to the server. The server may respond to the multiple actions at the same time (e.g., during the same communication session) or may respond to different actions at different times. An example structure is described that provides logic for handling the communication of data between a handheld computer and another computing device as well as communicating the data to and from one or more application programs.

In one embodiment, a transport component receives a request to perform an action from a handheld computer. A router is coupled to the transport component and identifies an action contained in the received request. An executor is coupled to the router and executes the identified action. The executor also generates a response based on execution of the identified action. The transponder component also communicates the response to the handheld computer.

In another embodiment, a method identifies multiple actions supported by a server. A user request is received to perform an operation. The method determines an action associated with the requested operation. The server is requested to perform the action. A response is received from the server such that the response is generated as a result of performing the action.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION

The systems and methods described herein provide for the exchange of data between two devices. For purposes of explanation, numerous specific details are set forth in order to provide a thorough understanding of the various systems and methods. It will be apparent, however, that the systems and methods described herein may be implemented without these specific details. The specification and drawings are, accordingly, to be regarded in an illustrative rather than a restrictive sense.

Specific examples are discussed herein with reference to a server and a handheld computer. However, the methods and systems described herein can be used by any computing device to communicate with another computing device. Additionally, various examples are described with reference to a wireless communication link that allows two computing devices to communicate with one another. Alternate embodiments may utilize a wired communication link or a combination of one or more wireless communication links and one or more wired communication links.

As used herein, a handheld computer includes any portable computing device and any mobile computing device.

Example handheld computers include PDAs, cellular phones, communicators, vehicle-based computer systems and laptop computers.

Figure 1:
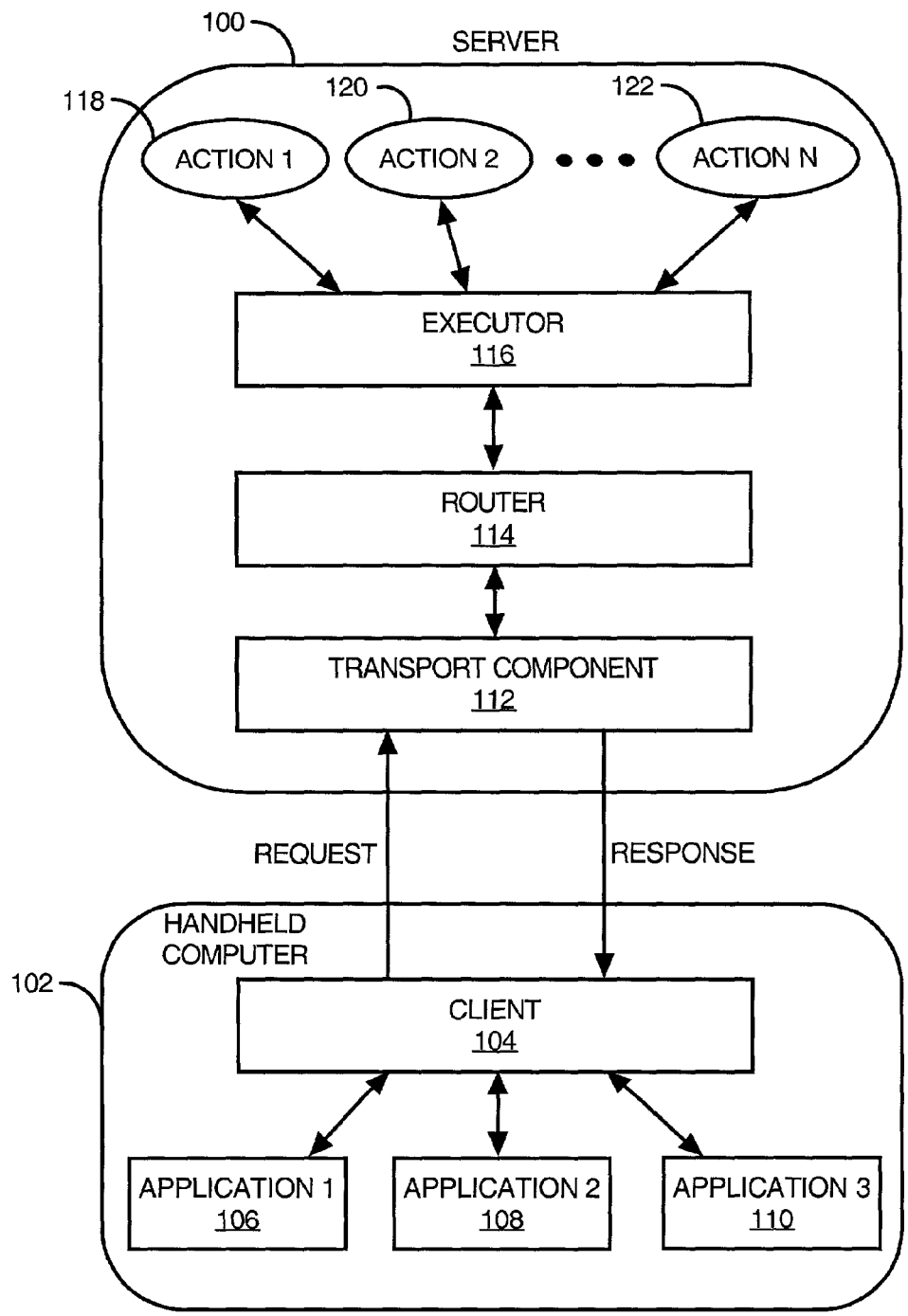
FIG. 1 illustrates a block diagram of a server and a handheld computer that are capable of exchanging data with one another.

FIG. 1 illustrates a block diagram of a server 100 and a handheld computer 102 that are capable of exchanging data with one another via a wired or wireless communication link. Handheld computer 102 includes a client 104 that is capable of generating requests for data and/or requests to perform one or more actions. These requests are communicated to server 100 for processing. Client 104 also receives responses from server 100 and handles those responses. The responses are generated by server 100 as part of processing the request for data or a request to perform one or more actions. A response may include data, instructions, or other information that satisfies the requests sent by client 104. For example, client 104 generates a request to fetch an email message and sends that request to server 100. Server 100 locates the requested email message and responds with information regarding that email message (e.g., sender, date, subject, and message body).

Handheld computer 102 also includes three application programs 106, 108 and 110. Although handheld computer 102 contains three application programs 106-110, a particular handheld computer may contain any number of application programs. Any or all of these application programs 106-110 may interact with client 104 to generate one or more requests for server 100 and receive data back in response to the requests. The application programs 106-110 may include, for example, an email application program, a database access program, a contact manager and a text editing application.

The architecture of server 100 provides specific logic for processing data and delivering data to the appropriate application. This architecture provides a peer-to-peer messaging framework for devices to exchange data via a wireless communication link. This architecture permits the development of cross-platform client-server wireless applications. The addition of an invocation layer, discussed below, assists with the handling of data and ensures that data is provided to the appropriate application.

The architecture of server 100 is configured to process various "actions" and other functions. An "action" is an application-level task that, when performed, generates a response that is provided to the user (or application) requesting that the action be performed. In one embodiment, actions are implemented as classes in an object oriented language, such as C++. Each application program supports one or more actions. For example, an email application may support actions such as "fetch messages" and "delete messages". A client device (such as a handheld computer) uses the services of a server supporting this architecture to execute the actions and provide the results to the client device.

Actions can be grouped together based on the application that the actions are associated with or the type of application that the actions are associated with (e.g., an email application or all database-related applications). A particular action may be associated with two or more applications and/or two or more types of applications. Additionally, a particular action may be associated with a particular user. Each action includes one or more components, such as an action name, an action identifier, an application identifier and a payload, which contains various data that is associated with the action.

Referring again to FIG. 1, handheld computer 102 sends requests to a transport component 112 in server 100. Handheld computer 102 also receives responses from server 100 via transport component 112. Transport component 112 is responsible for receiving requests from clients and sending responses to clients across a network messaging and transport layer.

Transport component 112 is coupled to a router 114, which maintains system resource information and assists the transport component with the identification of actions contained in received requests. The transport component 112 interprets the received requests and, using the services of router 114, sends the actions contained in the request to an executor 116, which is coupled to router 114. Executor 116 executes the actions contained in the request and generates responses to be sent to the source of the request. For example, executor 116 may execute one or more of actions 118, 120, and 122. Transport component 112 receives the response from executor 116 and communicates the response to the client device that sent the original request.

The server may have a set of pre-defined supported actions that can be executed by the executor 116. However, executor 116 is also capable of executing other actions that are not contained in the set of pre-defined supported actions. For example, executor 116 can execute actions that are self-described and/or self-executing.

In one embodiment, transport component 112 is implemented as a standalone server application. Alternatively, transport component 112 is part of another application or system in server 100. In a particular embodiment, transport component 112 has some knowledge of the corresponding transport component on the client. The transport component 112 also has some knowledge of the various actions, action responses and other data associated with the actions.

In a specific implementation, the architecture described above with respect to server 100 is a component of another server architecture. For example, a Java implementation provides an HTTP transport core component that hosts the architecture described above inside a generic HTTP server plug-in module. This module receives incoming HTTP requests and sends HTTP responses based on the received requests. The module is the runtime environment for the router and the executor discussed above. This implementation allows the architecture described above to operate in several different HTTP server environments.

In a particular embodiment of handheld computer 102, client 104 contains a transport component similar to transport component 112 in server 100. Similarly, client 104 contains a router and an executor similar to router 114 and executor 116 in server 100. The transport component in client 104 communicates with transport component 112 via the network messaging and transport layer. Client 104 has some knowledge regarding the actions and other functions that are supported by server 100. Thus, client 104 may communicate with different servers, knowing the actions supported by each server. The router and executor in client 104 work in combination with the transport component in the client to receive and process requests from an application. Additionally the router and executor in client 104 assist with processing data contained in responses and providing that data to the appropriate application in handheld computer 102.

Although not shown in FIG. 1, a particular server 100 may also include various application programs, some of which may be utilized to perform the actions discussed above. Other application programs stored on server 100 may assist with the operation of any of the components shown in FIG. 1.

Figure 2:
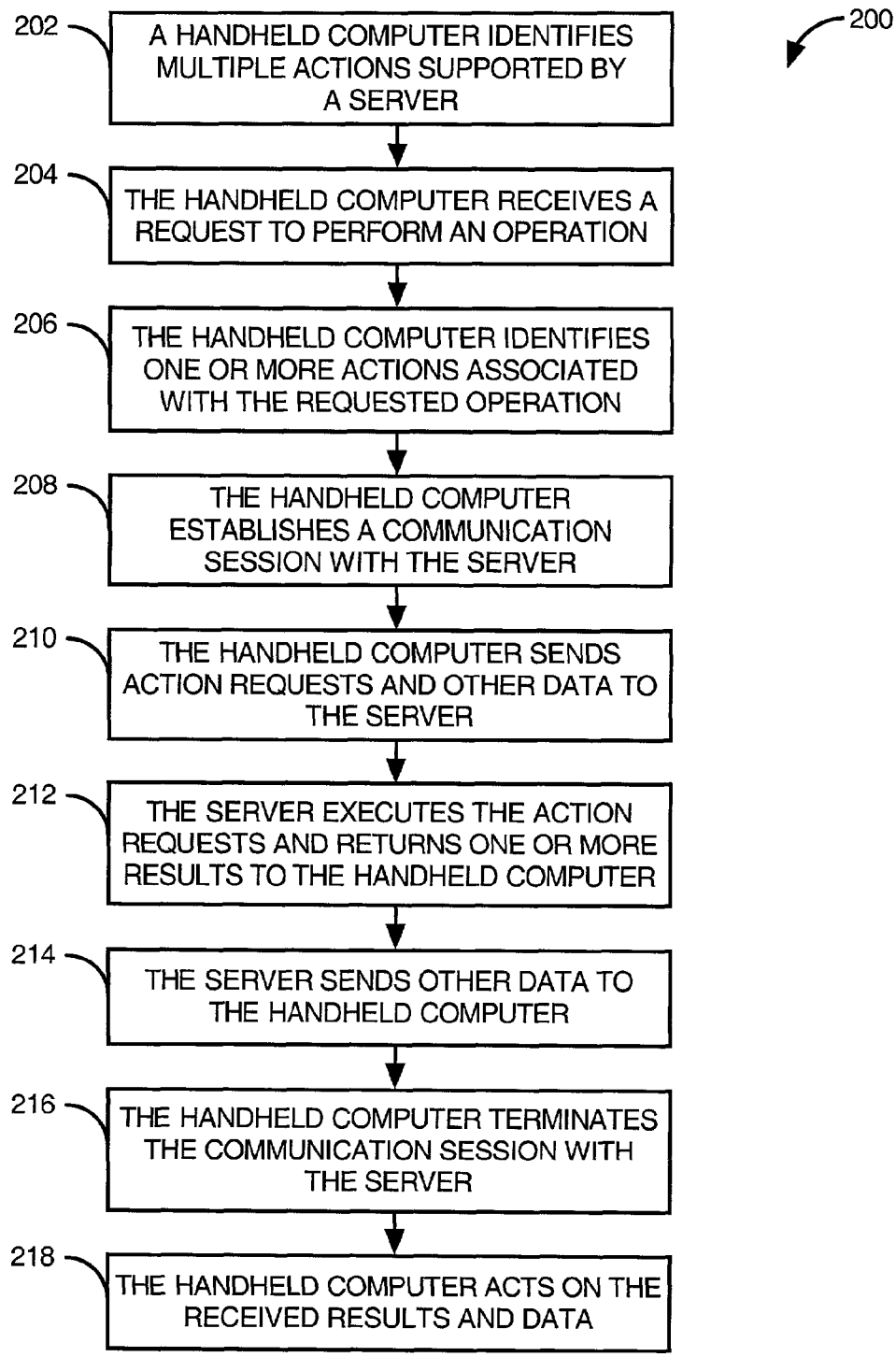
FIG. 2 illustrates a flow diagram of a procedure for exchanging data between a handheld computer and a server.

FIG. 2 illustrates a flow diagram of a procedure 200 for exchanging data between a handheld computer and a server, such as handheld computer 102 and server 100. Initially, a handheld computer identifies multiple actions supported by a server (block 202). This information can be downloaded into the handheld computer or otherwise stored in the handheld computer. In a particular embodiment, the information regarding supported actions is stored in the handheld computer along with one or more application programs that utilize any of the supported actions. In another embodiment, the information regarding supported actions is stored in the handheld computer by the manufacturer, distributor, or seller of the handheld computer.

At block 204 of FIG. 2, the handheld computer receives a request to perform an operation. This request is typically initiated by a user of the handheld computer. Alternatively, the request may be generated by an application program executing on the handheld computer or another device coupled to the handheld computer (such as a server). The handheld computer identifies one or more actions that are associated with the requested operation (block 206). For example, a request to retrieve new email messages may require multiple actions, such as 1) identify new email messages, and 2) communicate new email messages to the handheld computer.

After identifying the actions associated with the requested operation, the handheld computer establishes a communication session with the server (block 208). Typically this communication session is a wireless communication session. Once the communication session is established, the handheld computer sends one or more action requests and other data to the server (block 210). As discussed in greater detail below, a particular request may contain multiple actions as well as metadata that applies to all of the actions in the request.

After receiving the action requests form the handheld computer, the server executes the requested actions and returns one or more results to the handheld computer (block 212). The server then sends any other data to the handheld computer (block 214). This other data may include application program updates, data to be synchronized with the handheld computer and the like. After receiving the responses and other data from the server, the handheld computer terminates the communication session with the server (block 216). The handheld computer then acts on the received results and other data (block 218). For example, the handheld computer may display the new email messages received from the server and synchronize any such data received from the server.

Although the example of FIG. 2 discusses multiple action requests and multiple responses, a particular communication session may include a request containing a single action and a response containing a single result. Alternatively, if the action takes more time than the duration of the communication session, the response from the server may not be received until the next communication session is established.

Figure 3:
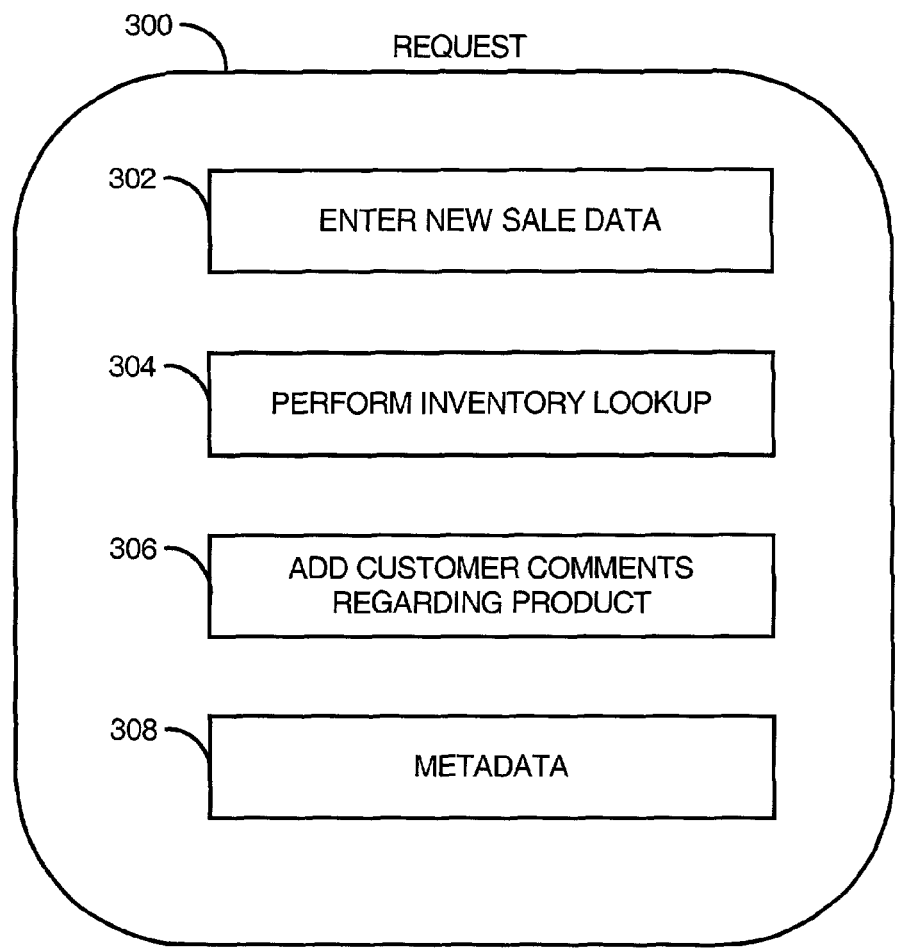
FIG. 3 illustrates an exemplary request containing multiple actions and a set of metadata associated with the multiple actions.

FIG. 3 illustrates an exemplary request 300 containing multiple actions and a set of metadata 308 associated with the multiple actions. Request 300 includes three actions to be performed by a server: enter new sale data 302, perform inventory lookup 304 and add customer comments regarding products 306. Additionally, the set of metadata 308 contains information related to all three actions 302-306. The metadata includes instructions and parameters that are used by the server to execute the actions 302-306 contained in request 300. Table 1 below illustrates example metadata used with actions that are associated with an email application.

TABLE 1

| Device GUID | A unique identifier for the device calling the server |
| Account Type | The type of account to check (e.g., Palm.net, external POP3 or IMAP4) |
| Username | The user's account user name |
| Password | The user's account password |
| Reply Address | The SMTP reply address for the user |

TABLE 1-continued

| Display Name | The display name for the user |
| Mail Server | Optional mail server name for external (POP3 or IMAP4) accounts |

Figure 4:
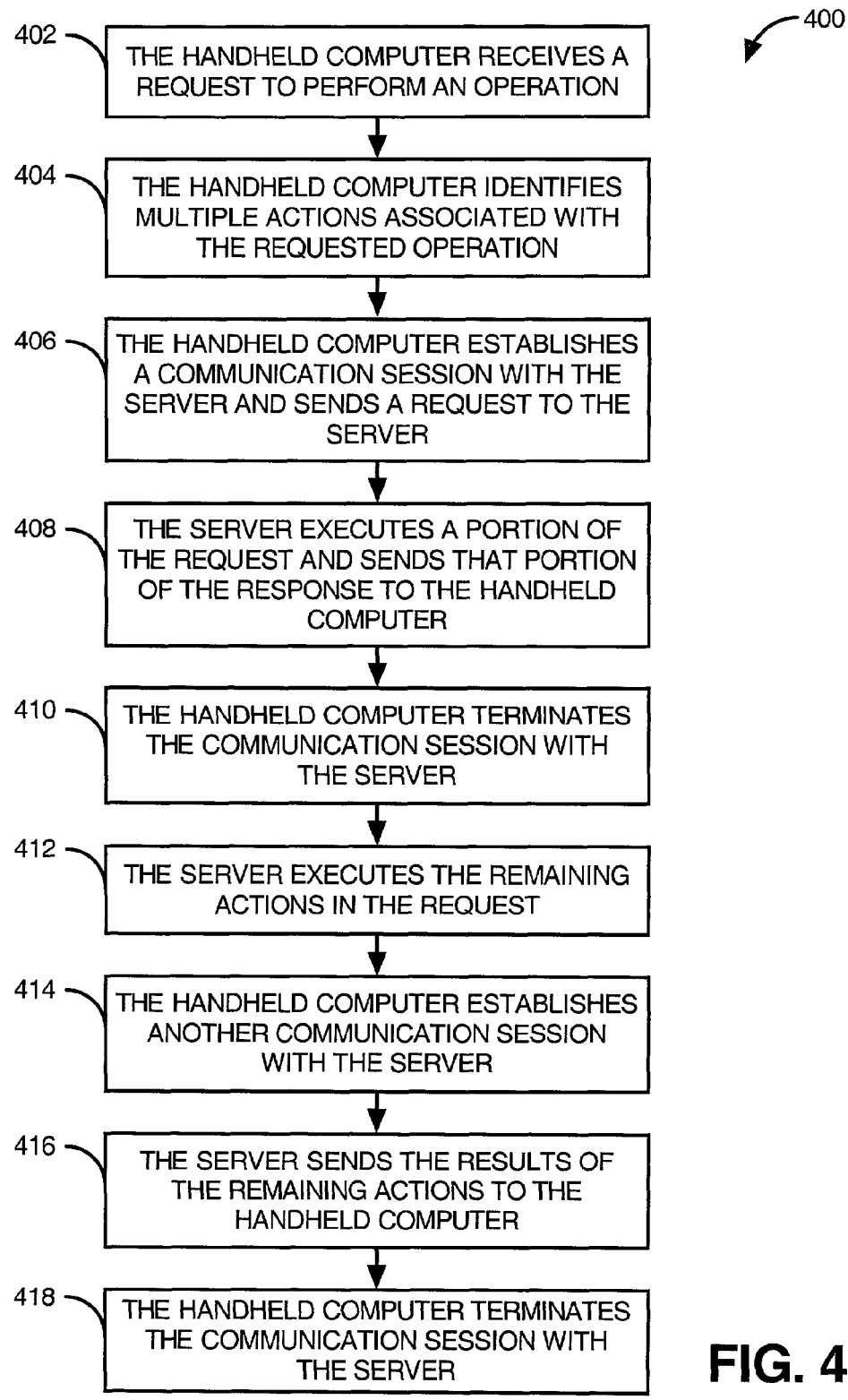
FIG. 4 illustrates a flow diagram of a procedure for exchanging data between a handheld computer and a server during two different communication sessions.

FIG. 4 illustrates a flow diagram of a procedure 400 for exchanging data between a handheld computer and a server during two different communication sessions. Initially, the handheld computer receives a request to perform an operation (block 402). The handheld computer identifies multiple actions associated with the requested operation (block 404). Alternatively, the handheld computer may receive requests to perform multiple operations, each of which has one or more associated actions.

The handheld computer then establishes a communication session with the server and sends a request containing multiple actions to the server (block 406). This request may resemble request 300 shown in FIG. 3. Initially, the server executes a portion of the multiple actions contained in the request and sends that portion of the response to the handheld computer (block 408). For example, the server may be able to perform some of the requested actions quickly, but may require additional time and/or additional information to finish executing the other actions.

The handheld computer then terminates the communication session with the server (block 410). After the communication session is terminated, the server executes the remaining actions in the request (block 412). At a later time, the handheld computer establishes another communication session with the server (block 414). At this point, the server has finished executing the remaining actions in the request, so the server sends the results of the remaining actions in the request to the handheld computer (block 416). The handheld computer then terminates the communication session with the server (block 418).

In alternate embodiments, one or more new requests may be communicated to the server during the second communication session. The actions associated with these requests may be executed and communicated to the handheld computer before the second communication session is terminated. However, if any actions are not executed before the second communication session is terminated, execution will be completed and the results will be communicated to the handheld computer during a future communication session. Thus, it may be necessary to establish any number of communication sessions for the handheld computer to receive all responses to multiple requests submitted to the server.

Figure 5:
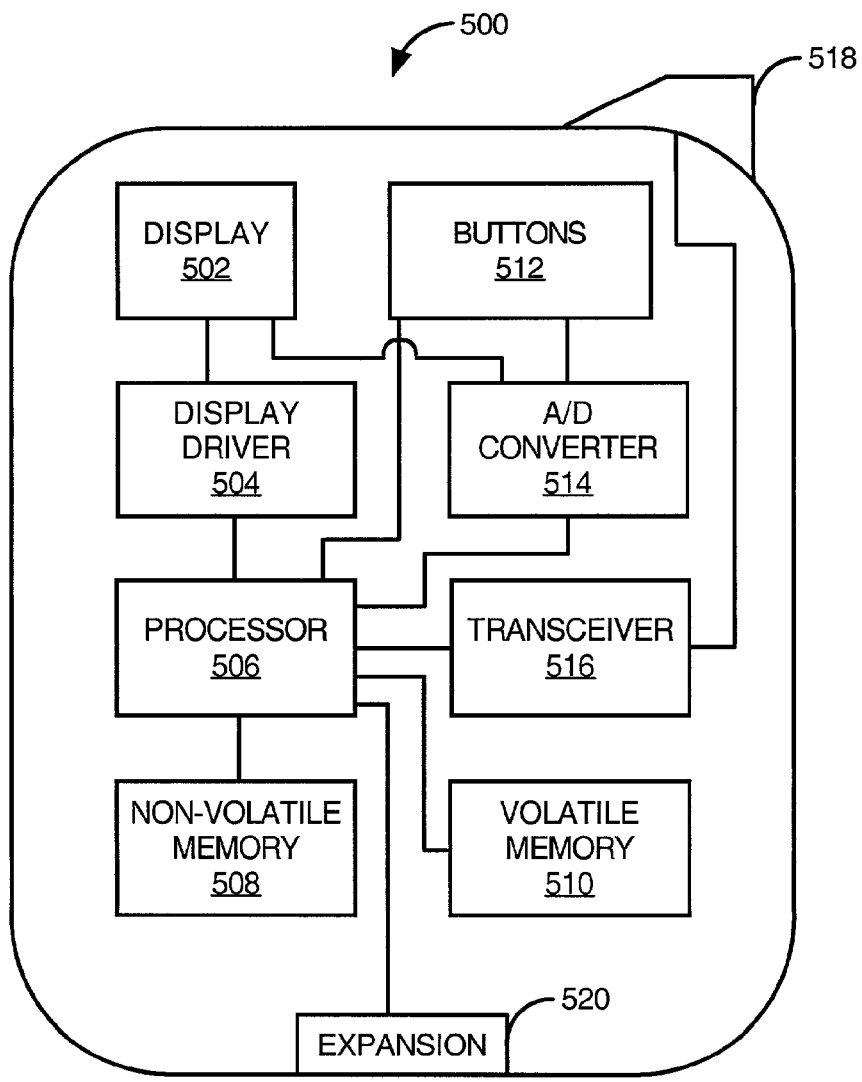
FIG. 5 is a block diagram of an example handheld computer.

FIG. 5 is a block diagram of an example handheld computer 500. In the embodiment of FIG. 5, handheld computer includes a processor 506 coupled to a first memory 508 (non-volatile) and a second memory 510 (volatile). The processor 506 is coupled to a display driver 504. The processor 506 works in combination with display driver 504 to process and signal data for presentation on a display assembly 502. The display assembly 502 includes, for example, a screen for displaying information and a digitizer for receiving user input.

An analog-digital (A/D) converter 514 is coupled to processor 506. One or more channels from A/D converter 232 maybe used to convert analog input provided by the digitizer or by another analog input mechanism.

The handheld computer 500 may include one or more expansion ports for coupling to accessory devices, such as cradles, modems, memory units, re-chargers and other devices. Examples of expansion ports include serial ports, Universal serial Bus (USB) ports, CompactFlash slots and infra-red ports. In an embodiment shown, a first expansion port 520 enables one or more types of expansion modules to be connected to processor 506. The handheld computer 500 may also include a second expansion port (not shown) to couple to another accessory device. Each expansion port may be coupled to processor 506, although the components that receive a signal from one of the expansion ports are determined by the type of accessory device selected.

The accessory device that may be coupled to an expansion port may be identified by primary functions of their internal components. Each accessory device may include one or more of the following set of components: a radio-frequency transmitter and/or receiver, a processor, an input mechanism, additional memory, a battery, or another A/D converter.

One or more buttons 512 are coupled to processor 506 and A/D converter 514. Buttons 512 provide a mechanism for a user to provide input to the handheld computer 500, such as selecting a menu option, launching an application program, or navigating through an application program. A transceiver 516 is coupled to processor 506 and an antenna 518. Transceiver 516 is capable of sending and receiving signals across a wireless communication link using antenna 518. This configuration allows handheld computer 500 to communicate with servers and other wireless devices.

The handheld computer illustrated in FIG. 5 represents one possible configuration of components. In alternate embodiments, the handheld computer may contain additional components or may have one or more illustrated components removed. Further any two or more components can be combined into a single component.

In the various examples and descriptions provided herein, the handheld computer generates requests and the server generates responses based on one or more actions included in the requests. However, in alternate embodiments, the server may generate one or more requests that are processed by the handheld computer. The handheld computer then generates one or more responses that are communicated to the server. This alternate embodiment uses procedures similar to those discussed herein with respect to FIGS. 2 and 4.

APPENDIX

The following materials describe several example actions, request formats, response formats and various description formats that can be used with the systems and methods discussed herein.

Fetch Messages (id 110)

Retrieves a set of messages, bounded by some conditions, including unique IDs. This Action may be used to request a single message based on its ID, search for new ones, synch, and others. The messages are returned with UIDs intact. The amount of the message data returned, as well as what level of attachment data to return, is configurable at the time of execution. In general, the message structure is based on the MIME extensions to RFC822.

| | |
|---|---|
| Max Messages | Maximum number of messages to retrieve |
| Bound | Bound condition (may be nested) to exclude messages from the fetch |
| Start ID | ID bound - retrieve messages after the one with this ID |
| Content Descriptors | Set of message content descriptors indicating how to fetch different message parts - defined below |

The Bound is the means for limiting the message set returned to the client. There are two main types of Bounds, Logical and Conditional.

Logical bounds represent an AND or an OR of some other bounds.

| | |
|---|---|
| Logical Type | AND or OR |
| Number of bounds | Number of nested bounds |
| Bounds | The nested bounds the logical operation is applied to |

Conditional Bounds represent conditions that can be tested for truth, indicating whether or not the Bound is satisfied. There are several types of Bounds for testing different kinds of conditions, such as strings being equal, integers being greater, etc. The general form of the Conditional Bound is:

| | |
|---|---|
| Key ID | Item to apply the bound to, identified by a unique key (i.e.: Subject, Sender, CC, BCC, To, id's, size, read flag) |
| Condition | The bound condition depends on the type of the bound |

For String bounds, the Condition is defined as:

| | |
|---|---|
| Pattern | The pattern to apply the criteria to |
| Criteria ID | CONTAINS, DOES_NOT_CONTAIN, STARTS_WITH |

The available string condition bounds are:

| Key ID | Quantity |
|---|---|
| 1 | Subject |
| 2 | TO |
| 3 | CC |
| 4 | From/Sender |

For Integer bounds, the Condition is defined as:

| | |
|---|---|
| Integer | The integer to test |
| Criteria ID | GREATER_THAN, LESS_THAN |

The available integer condition bounds are:

| Key ID | Quantity |
|---|---|
| 1 | Message size |

For Date bounds, the Condition is defined as:

| | |
|---|---|
| Date | The date to test |
| Criteria ID | ON, BEFORE, AFTER |

The available date condition bounds are:

| Key ID | Quantity |
|---|---|
| 1 | Received date |

For Boolean bounds, the Condition is defined as:

| Criteria ID | TRUE, FALSE |
|---|---|

The available Boolean condition bounds are:

| Key ID | Quantity |
|---|---|
| 1 | Message marked read |

For Message ID bounds, the Condition is defined as:

| ID set | The set of mail IDs (i.e.: IMAP4 UID or POP3 UID) to test against |
|---|---|
| Criteria ID | NONE_OF, ONE_OF |

The available message ID condition bounds are:

| Key ID | Quantity |
|---|---|
| 1 | The ID of the primary message |

Content descriptors are the mechanism through which the client can indicate to the server which types of content it would like to pull down in this initial fetch.

| Content Type | The content-type for which to retrieve content |
|---|---|
| Bytes | Bytes of content to get |
| Maximum Parts | Maximum number of parts of this content-type to fill |

The response to this type of action contains the appropriate message data, with some meta information.

| Status | Status code |
|---|---|
| Count | Total number of messages returned |
| Messages | Defined below |

The individual messages contain the following set of information

| UID | UID of the message |
|---|---|
| Read | Whether or not the message has been read |

| From | Sender's 822 addresses |
|---|---|
| Reply-to | 822 Reply-to header |
| TO List | Semicolon-separated list of 822 addresses |
| CC List | Semicolon-separated list of 822 addresses |
| Date | The received date of the message |
| Subject | Message subject |
| Part | Top-level message part, defined below |

Where a Part is:

| Part Type | The type of part: Multi, Plain Text, or Other |
|---|---|
| Part Detail | Depends on type of part, defined below |

A "MultiPart" represents a parent node in a hierarchical structure of parts:

| Multipart Type | Mixed, Alternative, Parallel, Digest, Other |
|---|---|
| Child Count | Number of sub-parts |
| Part Descriptors | Descriptors for each Part, essentially one of the other two types of parts, discussed below |

An "Other" part represents any part for which specific additional information is not known:

| Content Type | Content-type of the part |
|---|---|
| Total Size | Total size, in bytes, of the part |
| Retrieved Size | Number of bytes retrieved - actually brought down from the server |
| Start Offset | Starting byte of content |
| Number | The part number, used to uniquely identify it later on |
| Name | Name of the part, based on "filename" MIME attributes |
| Content | The actual content of the part, with initial transfer-encoding in place |
| Encoding | Transfer-encoding of the part |

A "Plain Text" part represents any part for which it is possible for the server to transform or decode the content into plain-text:

| Total Size | Total size, in bytes, of part |
|---|---|
| Retrieved Bytes | Number of bytes retrieved |
| Start Offset | Starting byte |
| Number | The part number, used to identify it in later transactions |
| Name | The name of the part, from the "filename" attribute |
| Content | Content of part, plain-text |

Delete Message (id 100)

This Action deletes a message from the back-end message store. The message is referenced by its ID. The response will include appropriate errors if the message has already been deleted or is otherwise unavailable.

| | |
|---|---|
| ID | ID of message to delete |

The response to this Action contains just a single piece of information, the status.

| | |
|---|---|
| Status | Status code |

Send Message (id 115)

Sends a message to recipient(s) through the server. All fully-resolved address information is provided by the client. The reply-to and from information is based on the meta-data discussed earlier. The Action supports the notion of messages that are forwards of or replies to existing messages. The significance of this is that messages with large attachments do not need to be fully retrieved to be forwarded with attachment data intact. The response will include appropriate errors if a referenced existing message for reply or forward has been deleted or is otherwise unavailable.

| | |
|---|---|
| Type | The type of message, standard, forward, or reply |
| Reply-To | The reply-to address which will go into the MIME 'REPLY-TO' header. |
| To List | List of standard TO addresses |
| CC List | List of CC addresses |
| BCC List | List of BCC addresses |
| Subject | Subject text of message |
| Message Part | Message Part describing the part structure of the message |
| Associated ID | ID of associated reply or forward message |

The response to this Action contains just a single piece of information, the status.

| | |
|---|---|
| Status | Status code |

Get Message Content (id 99)

This Action retrieves additional bytes of a message for which headers and initial data have already been retrieved. This is designed to allow the client to sequentially retrieve more and more of an existing message, or to retrieve attachment data not previously fetched for that message, given the existing message ID. The response will include appropriate errors if a referenced existing message has been deleted or is otherwise unavailable.

| | |
|---|---|
| ID | ID of message from which to read content |
| Part Number | The number of the part to retrieve content from. |
| Byte Offset | Byte offset at which to start retrieving content. |
| Total Bytes | Total bytes to retrieve. |

The response to this Action contains a status code and the actual fetched content.

| | |
|---|---|
| Status | Status code |
| Content | The requested content |

Stat (id 120)

The Stat Action retrieves the IDs and read/unread state of all existing server-side messages. This is designed to allow the client to resolve out-of-synch issues with the server.

| | |
|---|---|
| Maximum Stats | Maximum number of message ID/read flags to retrieve. |

The response will include an optionally large amount of information, depending on the number of messages available on the server. There will be numerous ID/Flag pairs in the response.

| | |
|---|---|
| Status | Status code |
| Number | The total number of messages |
| ID | The ID of a message |
| Read Flag | The read/unread status of the message |

Set Message Read State (id 114)

This Action sets the read/unread state for messages on the server. This allows the client to synch the server-side status of the messages, meaningful to the user when accessing the mail store via another interface.

| | |
|---|---|
| ID | ID of message for which to set read state |
| State | Boolean indicating whether the message should be marked as read or unread |

The response to this Action contains just a single piece of information, the status.

| | |
|---|---|
| Status | Status code |

General Form

In all subsequent discussion of this format, the use of the following delimiter characters is assumed.

| Text Protocol Delimiter characters | |
|---|---|
| DELIM_1 | 0x1 |
| DELIM_2 | 0x2 |
| DELIM_3 | 0x3 |
| DELIM_4 | 0x4 |

In discussions of the text format, the > and < characters are used to indicate the start and end of the format specification, but are not included within it. Entities in a format specification are separated by delimiters, which are indicated as <DELIM_N> as defined above. In general, entries within the various format specifications can be omitted if they are optional in the Action-level specification, leaving two delimiters side-by-side.

| META_ARG | Value in Metadata Description Format |
|---|---|
| ACTION_ARG1 | Value in Action Description Format |
| ACTION_ARG2 | Value in Action Description Format |
| ACTION_ARGn | Value in Action Description Format |

Where META_ARG and ACTION_ARG are defined as:

META_ARG

The argument used to indicate the Metadata Definition is simply a single reserved character.

>m<

ACTION_ARG

The argument used to provide an Action Description is the Action Number (1-10) and Action ID (a single reserved byte for each Action), joined with no delimiters between. Each Action has a corresponding ID.

>NUMID< and the contents of each type of block are defined as:

Metadata Description Format

>GUID<DELIM_1>ACCTTYPE<DELIM_1>USER<DELIM_1>PW<DELIM_1>
SMTP<DELIM_1>
PERSONAL<DELIM_1>EXHOST<

Where GUID is a one-character GUID type identifier followed by an arbitrary length string containing the actual GUID.

Action Description Format

The Action Description Format is specific to each Action, discussed in the following sections.

Response Format

The server responds to a Request with a single block of formatted data. The general format of the server's response is:

>STAT<DELIM_1>SIZE1<DELIM_1>ACTIONRESPONSE1<DELIM_1>SIZE2 <DELIM_1>ACTIONRESPONSE2<DELIM_1>SIZEn<DELIM_1>ACTIONRE SPONSEn<DELIM_1>

<DELIM_1><

| | |
|---|---|
| STAT | The status code of the overall request. If an error occurred, the following delimiter will be the last character in the response. |
| SIZEn | The size, in bytes, of the following ACTIONRESPONSE |
| ACTIONRESPONSEn | The *Action Response Description*, particular to the Action in question. |

Shared Description Formats

There are several description formats that are utilized in the context of multiple actions. These formats are described below, and are referenced in specific Action and Action Response Description Formats.

Message Part Description Format

MSGPART

>TYPE<DELIM_4>DETAIL<DELIM_4><

| TYPE | "1" = Multi "2" = PlainText "3" = Unknown |
|---|---|
| DETAIL | Defined below, different for each part-type |

DETAIL (Multi)

>TYPE<DELIM_4>COUNT<DELIM_4>MSGPART1<DELIM_4>MSGPART2<DELIM_4>MSGPARTn<

| TYPE | "1" = Alternative "2" = Mixed "3"= Parallel "4" = Digest "5" = Other |
|---|---|
| COUNT | Integer as string |
| PARTn | Any part format |

DETAIL (Unknown)

>CONTENTTYPE<DELIM_4>TOTAL<DELIM_4>RETRIEVED<DELIM_4>START<DELIM_4>NUM<DELIM_4>NAME<DELIM_4>CONTENT<DELIM_4>ENC<DELIM_4>MORE<

| CONTENTTYPE | Integer as string |
|---|---|
| TOTAL | Integer as string |
| RETRIEVED | Integer as string |
| START | Integer as string |
| NUM | Integer as string |
| NAME | String |
| CONTENT | String |
| ENC | String |
| MORE | Boolean as integer |

DETAIL (Plain Text)

>TOTAL<DELIM_4>RETRIEVED<DELIM_4>START<DELIM_4>NUM<DELIM_4>NAME<DELIM_4>CONTENT<DELIM_4>MORE<

| | |
|---|---|
| TOTAL | Integer as string |
| RETRIEVED | Integer as string |
| START | Integer as string |
| NUM | Integer as string |
| NAME | String |
| CONTENT | String |
| MORE | Boolean as integer |

Message ID Description Format

MSGID

>TYPEID<

| | |
|---|---|
| TYPE | "1" = Palm "2" = Enterprise "3" = UID |
| ID | ID as string |

Fetch Messages

Action Description Format

>MAX<DELIM_2>BOUND<DELIM_2>STARTID<DELIM_2>CONTENT1<DELIM_2>CONTENT2<DELIM_2>CONTENTn<

| MAX | Integer as string |
|---|---|
| BOUND | Defined below |
| STARTID | MSGID |
| CONTENTn | Defined below |

CONTENT

>TYPE<DELIM_3>BYTES<DELIM_3>MAXPARTS<

| TYPE | String |
|---|---|
| BYTES | Integer as string |
| MAXPARTS | Integer as string |

BOUND

>TYPE<DELIM_3>BOUNDDETAILS<

| TYPE | "1" = Logical, "2" = Conditional |
|---|---|
| BOUNDDETAILS | Defined below, per type |

BOUNDDETAILS (Logical)

>TYPE<DELIM_3>NUMNESTED<DELIM_3>BOUND1<DELIM_3>BOUND2<DELIM_3>BOUNDn<

| TYPE | "1" = AND, "2" = OR |
|---|---|
| NUMNESTED | Integer as string |
| BOUNDn | BOUND |

BOUNDDETAILS (Conditional)

>TYPE<DELIM_4>CONDITION<

| TYPE | "1" = String, "2" = Date, "3" = Integer |
|---|---|
| CONDITION | Defined below |

CONDITION (String)

>KEYID<DELIM_4>PATTERN<DELIM_4>CRITERIAID<

| KEYID | "1" = Subject, "2" = TO, "3" = CC, "4" = Sender |
|---|---|
| PATTERN | String |
| CRTIERIAID | "1" = Contains, "2" = Does not contain, "3" = Starts with |

CONDITION (Integer)

>KEYID<DELIM_4>INTEGER<DELIM_4>CRITERIAID<

| KEYID | "1" = Size |
|---|---|
| INTEGER | Integer as string |
| CRTIERIAID | "1" = Equals, "2" = Greater than, "3" = Less than |

CONDITION (Date)

\>KEYID<DELIM_4>DATE<DELIM_4>CRITERIAID<

| KEYID | "1" = Received |
|---|---|
| DATE | Date |
| CRTIERIAID | "1" = On, "2" = Before, "3" = After |

CONDITION (Boolean)

\>KEYID<DELIM_4>CRITERIAID<

| KEYID | "1" = Message marked read |
|---|---|
| CRTIERIAID | "1" = TRUE, "2" = FALSE |

CONDITION (Message ID)

\>KEYID<DELIM_4>CRITERIAID<DELIM_4>IDTYPE<DELIM_4>ID1

;ID2;ID1<

| KEYID | "1" = Primary UID of message |
|---|---|
| CRTIERIAID | "1" = None Of, "2" = One Of |
| IDTYPE | Standard Message ID types |
| IDn | An ID of the set, as a string |

Action Response Description Format

>STAT<DELIM_2>MSGTYPE<DELIM_2>MSGCOUNT<DELIM_2>MESSAGE1<DELIM_2>MESSAGE2<DELIM_2>MESSAGEn<

| STAT | Integer as string |
|---|---|
| MSGTYPE | "1" = Standard "2" = PalmNet "3" = Blaster |
| MSGCOUNT | Integer as string |
| MESSAGEn | Defined below, differs for each type of message |

MESSAGE (Standard)

>UID<DELIM_3>READ<DELIM_3>FROM<DELIM_3>TOLIST<DELIM_3>CCLIST<DELIM_3>DATE<DELIM_3>SUBJECT<DELIM_3>MSGPART<

| | |
|---|---|
| UID | String |
| READ | "1" or "0" |
| FROM | String |
| REPLY-TO | String |
| TOLIST | Semicolon-separated strings |
| CCLIST | Semicolon-separated strings |
| DATE | Seconds since 1/1/1904 as string |
| SUBJECT | String |
| MSGPART | Defined earlier |

MESSAGE (PalmNet)

>UID<DELIM_3>PALMID<DELIM_3>READ<DELIM_3>FROM<DELIM_3>TOLIST<DELIM_3>CCLIST<DELIM_3>DATE<DELIM_3>SUBJECT<DELIM_3>MSGPART<

| UID | String |
|---|---|
| PALMID | String |
| READ | "1" or "0" |
| FROM | String |
| REPLY-TO | String |
| TOLIST | Semicolon-separated strings |
| CCLIST | Semicolon-separated strings |
| DATE | Seconds since 1/1/1904 as string |
| SUBJECT | String |
| MSGPART | Defined earlier |

MESSAGE (Blaster)

>UID<DELIM_3>PALMID<DELIM_3>ENTID<DELIM_3>READ<DELIM_3> FROM<DELIM_3>MSGPART<

| UID | String |
|---|---|
| PALMID | String |
| ENTID | String |
| READ | "1" or "0" |
| FROM | Encrypted sender as string |
| REPLY-To | String |
| MSGPART | Defined earlier |

Delete Message

Action Description Format

>MSGID<

| MSGID | Defined earlier |
|---|---|

Action Response Description Format

>STAT<

| STAT | Integer as string |
|---|---|

Send Message

Action Description Format

>TYPE<DELIM_2>TOLIST<DELIM_2>CCLIST<DELIM_2>BCCLIST<DELIM_2>SUBJECT<DELIM_2>PART<DELIM_2>ASSOCID<

| TYPE | "1" = standard "2" = forward "3" = reply |
|---|---|
| REPLY-TO | String |
| TOLIST | Semicolon-separated strings |
| CCLIST | Semicolon-separated strings |
| BCCLIST | Semicolon-separated strings |
| SUBJECT | String |
| PART | Defined above |
| ASSOCID | MsgID |

Action Response Description Format

>STAT<

| STAT | Integer as string |
|---|---|

Get Message Content

Action Description Format

>MSGID<DELIM_2>PARTNUM<DELIM_2>OFFSET<DELIM_2>TOTAL<

| MSGID  | Defined earlier   |
|--------|-------------------|
| PART   | Integer as string |
| OFFSET | Integer as string |
| TOTAL  | Integer as string |

Action Response Description Format

>STAT<DELIM_2>CONTENT<

| STAT    | Integer as string |
|---------|-------------------|
| CONTENT | string            |

Stat

Action Description Format

>MAX<

| MAX | Integer as string |
|-----|-------------------|

Action Response Description Format

>STAT<DELIM_2>NUM<DELIM_2>IDSET<DELIM_2>READ1<DELIM_2>IDSET2<DELIM_2>READ2<DELIM_2>IDSETn<DELIM_2>READn<

| STAT | Integer as string |
|---|---|
| NUM | Integer as string |
| IDSETn | Defined below |
| READn | "1" or "0" |

IDSET

>MSGID1<DELIM_3>MSGIDn<

| MSGIDn | Defined earlier |
|---|---|

Set Message Read State

Action Description Format

>MSGID<DELIM_2>STATE<

| MSGID | Defined earlier |
|-------|-----------------|
| STATE | "1" or "0" |

Action Response Description Format

>STAT<

| STAT | Integer as string |
|------|-------------------|

What is claimed is:

1. A system for providing a service to a mobile computing device over a cellular network, the system being implemented with a combination of hardware resources that include a processor and a memory, the system comprising:
   a transport component configured to receive, from over the cellular network, a request made at a first instance through operations of a corresponding mobile computing device, the request made at the first instance identifying two or more programmatic actions for performance by the service, wherein each of the two or more programmatic actions are received at the first instance before any one or more of the other of the two or more programmatic actions is performed, and wherein the request originates from two or more applications operating on the mobile computing device;
   a router coupled to the transport component and configured to identify each of the two or more programmatic actions contained in the received request;
   a plurality of service applications, including at least a first service application that is paired with a first of the two or more applications and a second service application that is paired with a second of the two or more applications; and
   an executor coupled to the router and configured to (i) cause, for the request made at the first instance from the mobile computing device, the two or more programmatic actions to be performed by at least the first service application and the second service application, and (ii) provide a response to the mobile computing device based on performance of the two or more programmatic actions;
   wherein the transport component is further configured to communicate one of (i) all of the response, or (ii) a remaining portion of the response, to the mobile computing device during one or more wireless communication sessions in response to the system making a determination that some or all of the response was not communicated to the mobile computing device during a preceding wireless communication session in which the request was received at the first instance.

2. The system of claim 1, wherein the executor is further configured to generate the response in relation to a set of metadata identified from the request or mobile computing device, wherein the metadata includes a unique identifier related to the mobile computing device.

3. A computer-implemented method for providing a service on a cellular network, the method being implemented using hardware resources that include a processor and a memory, the method comprising:
   engaging a mobile computing device during a first wireless communication session using the cellular network;
   during the first wireless communication session, receiving one or more requests over the cellular network, to perform two or more programmatic actions on behalf of two or more corresponding applications operating on the mobile computing device;
   responsive to receiving the one or more requests, selecting two or more applications to perform the two or more programmatic actions, wherein each of the two or more applications is paired with one of the corresponding two or more applications that operate on the mobile computing device;
   performing the two or more programmatic action to generate a response;
   subsequent to termination of the first wireless communication session, communicating with the mobile computing device to establish a second wireless communication session using the cellular network; then
   transmitting the response to the mobile computing device during the second wireless communication session.

4. The method of claim 3, wherein selecting two or more applications to perform the two or more programmatic actions includes identifying data related to at least one of the requests; and communicating the data related to the at least one of the requests to the application associated with the two or more programmatic actions.

5. The method of claim 3, further comprising automatically initiating the second wireless communication session with the mobile computing device responsive to the response not being either fully or partially transmitted during the first wireless communication session.

6. A computer-implemented method for providing a service on a cellular network, the method being implemented using hardware resources that include a processor and a memory, the method comprising:
   using the wireless cellular network to establish a first wireless communication session;
   during the first wireless communication session, receiving a request from the mobile computing device to perform one or more operations on behalf of two or more applications operating on the mobile computing device;
   identifying which of a plurality of applications operating on the mobile computing device are operated by a user of the mobile computing device to generate the request;
   determining which of a plurality of applications of the service is paired with the identified application operating on the mobile computing device;
   determining an identifier of the mobile computing device requesting the operation;
   identifying a plurality of actions that are to be performed in response to the request using the determined application on the service that is paired with the identified application operating on the mobile computing device;
   generating a response from performing the plurality of actions;
   using the wireless cellular network to establish a second wireless communication session; and
   during the second communication session, transmitting the response to the identified one of the plurality of application of the mobile device.

7. The method of claim 6, wherein generating a response includes generating a plurality of individual responses in which each individual response is associated with one of the plurality of actions.

8. The method of claim 6, wherein the plurality of actions are associated with a single application operated by the service.

9. The method of claim 6, wherein the plurality of actions is associated with a plurality of applications operated by the service, and wherein the response includes data generated by each of the plurality of applications.

10. A computer-implemented method for providing a service on a network, the method being implemented using hardware resources that include a processor and a memory, the method comprising:
    during a first wireless communication session established over a cellular network, identifying one or more requests communicated from a mobile computing device;
    determining which of a plurality of applications operating on the mobile computing device were used to generate the one or more requests, wherein each of the one or more requests were sent on behalf of two or more applications of the plurality of applications;

identifying, on the service, at least one application that is paired with the plurality of applications that were used to generate the one or more requests;

executing, through the at least one application, a first action and a second action in order to generate a first data portion and a second data portion; and during a second wireless communication session, transmitting a response to the mobile computing device over the cellular network, the response being based at least in part on the first data portion and on the second data portion.

11. The method of claim 10, wherein the first data portion is associated with the first action and the second data portion is associated with the second action.

12. The method of claim 10, wherein the response is generated after executing both the first action and the second action.

13. The method of claim 10, wherein the at least one application includes receiving metadata associated with the mobile computing device.

14. A system for providing a service on a cellular network, the system being implemented using hardware resources that include a processor and a memory, the system comprising:

a transport component configured to receive a request from a mobile computing device during a first wireless communication session over the cellular network and to transmit a response to the mobile computing device over the cellular network, the request having at least one action described therein and being generated from any one of a plurality of applications operating on the mobile computing device, and the request further including metadata having a unique identifier for identifying the mobile computing device;

a router coupled to the transport component and configured to identify an application for executing the at least one action contained in the request;

an executor coupled to the router and configured to execute the at least one action; wherein the response is based on an execution of the at least one action; and wherein the transport component is configured to communicate a response to the request to the one of the plurality of applications operating on the mobile computing device, and wherein the system is configured to make a determination as to whether the transport component communicated the response to the mobile computing device over the cellular network during the first wireless communication session, and in response to the determination being made that the response was not communicated during the first wireless communication session, the transport component is further configured to transmit at least a portion of the response to the mobile computing device during a second wireless communication session with the mobile computing device.

15. The system of claim 14, wherein the action contained in the request is associated with a particular application stored within the system.

16. The system of claim 14, wherein the executor is further configured to generate the response incorporating at least some of the metadata.

17. The system of claim 14, wherein the transport component is further configured to communicate to the mobile computing device a set of actions supported by the system.

18. The system of claim 1, wherein the transport component is configured to automatically establish the one or more subsequent wireless communication sessions with the mobile computing device upon the transport component being unable to communicate the response to the mobile computing device during the preceding wireless communication session.

19. The method of claim 10, further comprising transmitting from the system the first data portion during the first wireless communication session.

20. The method of claim 10, further comprising transmitting the first data portion during the second communication session.

21. A computer-implemented method for providing a service on a network, the method being implemented using hardware resources that include a processor and a memory, the method comprising:

during a first wireless communication session over a cellular network in which a mobile computing device is engaged with the service, receiving a communication from the mobile computing device specifying one or more actions;

identifying which of a plurality of applications operating on the mobile computing device was used to provide the communication, wherein the communication was sent on behalf of two or more applications of the plurality of applications;

determining which of one or more applications of the service are to be used to perform the one or more actions that are operable by one or more computers that are included in the service;

identifying the mobile computing device during a second wireless communication session in which the mobile computing device is engaged with the service; and during the second wireless communication session, sending data to the identified one or more applications operating on mobile computing device as a result of the determined one or more applications of the service performing the one or more actions specified during the first wireless communication session.

22. The method of claim 21, wherein receiving a communication comprises receiving metadata identifying the mobile computing device.

23. The method of claim 22, further comprising associating the metadata with the one or more applications performing the one or more actions.

24. The method of claim 22, wherein, prior to transmitting the response, the method further comprises:

formulating the response; and associating the metadata with the response.

25. The method of claim 21, wherein determining which of one or more applications of the service are to be used includes determining one or more applications that perform a send message action and a get message command action.

26. The method of claim 21, wherein receiving a communication from the mobile computing device specifying one or more actions comprises receiving one or more actions selected from a group consisting of a send message action, a fetch message action, a delete message action, a get message action, and a set Message Read State action.

27. The method of claim 21, wherein receiving a communication from the mobile computing device specifying one or more actions comprises receiving one or more actions selected from a group consisting of an enter new sale data action, a perform inventory lookup action, an add customer comment regarding products action, and combinations thereof.

28. The system of claim 1, wherein each of the two or more programmatic actions are selected from a group consisting of a send message action, a fetch message action, a delete message action, a get message action, a set Message Read State action, an enter new sale data action, a perform inventory lookup action, and an add customer comment regarding products action.

29. The method of claim 6, wherein each action in the plurality of actions is selected from a group consisting of a send message action, a fetch message action, a delete message action, a get message action, a set Message Read State action, an enter new sale data action, a perform inventory lookup action, and an add customer comment regarding products action.

30. The method of claim 10, wherein the first action and the second action are each selected from a group consisting of a send message action, a fetch message action, a delete message action, a get message action, a set Message Read State action, an enter new sale data action, a perform inventory lookup action, and an add customer comment regarding products action.

* * * * *